Oct. 8, 1935.    J. H. HUMBERSTONE    2,016,899
WELDING ELECTRODE
Filed Dec. 23, 1932

Inventor:
Joseph H. Humberstone,
by Charles E. Tullar
    His Attorney.

Patented Oct. 8, 1935

2,016,899

UNITED STATES PATENT OFFICE 2,016,899

WELDING ELECTRODE

Joseph H. Humberstone, Schenectady, N. Y., assignor to General Electric Company, a corporation of New York Application December 23, 1932, Serial No. 648,651

9 Claims. (Cl. 219—8)

My invention relates to electrodes for use in metallic arc welding.

In metallic arc welding an arc is maintained between the work to be welded and a rod, wire or strip of metal, which is referred to as an electrode, by connecting the work and the electrode to a suitable source of welding current. During the welding operation the electrode is fused or vaporized, or both, and the metal thereof deposited upon and welded to the work as the electrode is fed toward the work, either manually or automatically, to maintain the arc length substantially constant.

The quality of the weld metal, as well as the behavior of the welding arc, depends to a large extent upon the influence of certain elements or compounds associated with the electrode, usually in the form of a coating. Electrodes so coated are commonly designated as flux coated electrodes.

It is an object of my invention to provide an improved flux coated electrode which may be cheaply and quickly manufactured.

It is a further object of my invention to provide a flux coated electrode which can be handled or bent without having the coating flake or separate therefrom.

It is another object of my invention to provide a welding electrode of uniform quality having a coating of flux which is enclosed within a sheath of fibrous material.

It is also an object of my invention to provide a method of manufacturing electrodes of my improved construction.

Figure 1:
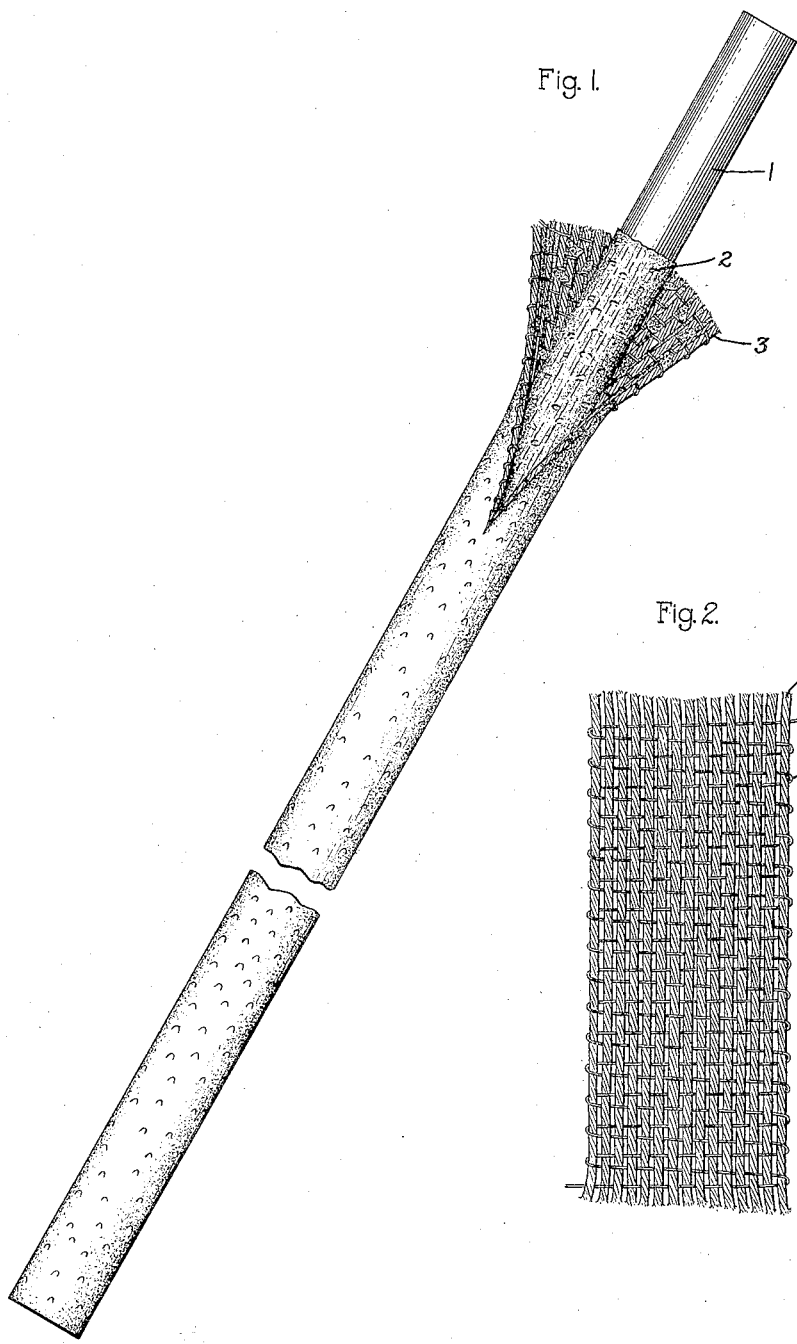
Figure 2:
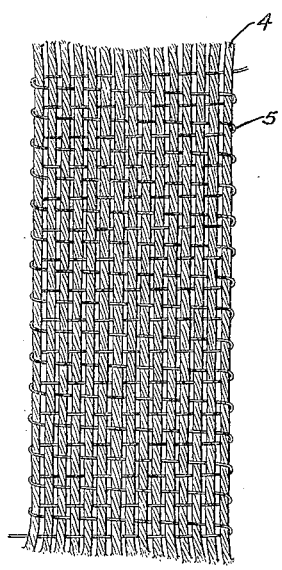

Further objects of my invention will appear from the following description taken in connection with the accompanying drawing, Fig. 1 of which illustrates one embodiment thereof, and Fig. 2 of which illustrates the tape which I prefer to use in fabricating my improved electrode.

The electrode shown in the drawing comprises a metallic core 1, coated with a flux 2, which in turn is covered by a tape 3 of fibrous material which is folded longitudinally about the core and the flux coating, with its edges abutting one another and parallel to the axis of the core. In the drawing the construction of the electrode has been illustrated by unfolding the tape 3 at the bared end of the electrode to illustrate the under coating of flux 2 which surrounds the metallic core 1.

The flux and tape may be applied to the electrode in any desired manner. I prefer, however, to apply simultaneously the flux coating and tape by drawing a bare core and a tape through a die submerged in a bath of the flux in paste form in a manner such as illustrated and described in Patent No. 1,525,840, Weed, February 10, 1925, for Electrode and method of making the same. The amount of flux applied to the core 1 when using this preferred method of manufacture will depend on the thickness of the tape employed as well as the opening in the die through which the tape and core are drawn. The tape has a natural tendency to engage the walls of the opening in the die as it is drawn therethrough and the flux flows in between the tape and the core as these parts are drawn through the die. By appying the tape in this manner, it is impregnated with the flux and securely united to the coating of flux which is being applied at the same time to the electrode between the core and the tape. The size of the opening in the die and the width of the tape employed are, in accordance with my invention, such that the edges of the tape abut one another thereby forming a uniform coating upon the electrode.

Various fluxes may be employed when manufacturing electrodes in accordance with my invention. I am presently employing a flux of the composition described and claimed in Patent No. 1,898,068, granted February 21, 1933, on an application, Serial No. 589,388 Lucian B. Thompson, and Verni J. Chapman, for Welding electrodes, filed January 28, 1932, and assigned to the same assignee as the present application. This flux has the following composition:—

| | Parts by weight |
|---|---|
| Ferro-manganese | 10 |
| Talc | 10 |
| Feldspar | 30 |
| Sodium silicate (liquid) | 24 |

This flux is non-inflammable and when applied in the manner above described likewise renders non-inflammable the tape 3 of fibrous material which forms the outside surface of the electrode. By applying the fibrous material as a tape in the manner above referred to, it is possible to obtain a layer of flux 2 between the core of the electrode and tape 3 of sufficient thickness to prevent rapid consumption of the tape under the influence of the arc during welding, thereby producing an electrode the arcing terminal of which is enclosed within a sleeve of flux material. This has a desired confining action on the arc which facilitates the welding operation and improves the quality of the weld metal.

In order to obtain an electrode which is uniform throughout its length, the tape of fibrous material applied to the exterior of the electrode should be of uniform quality and so constructed that it will not stretch appreciably in a lengthwise or crosswise direction. If a textile material is employed, the threads of the tape should be so interwoven that they will not be displaced relative to one another when subjected to a rubbing action such as occurs when applying the tape to the electrode by passing it through a die as above described. I have shown in Fig. 2 a construction which I prefer to use. The tape there shown is formed of a plurality of substantially parallel warp threads 4 which are of greater size than the filler or cross threads 5 by means of which they are held together in spaced relationship to form an open woven fabric. It will be noted that the filler threads cross the warp threads at substantially right angles thereby forming a fabric that will not stretch appreciably in a longitudinal or crosswise direction. By employing an open woven fabric such as illustrated, the flux material may readily fill in the interstices of the fabric and bind it more securely to the flux interposed between the fabric and the core of the electrode. By employing cross threads of smaller size than the warp threads, the thickness of the tape for a given weight of material and open weave may be kept at a minimum. It is not necessary that the relative weights of the warp and weft threads be of the relative size illustrated, as the cross or weft threads may be of much larger size and still obtain most of the advantages above noted when employing a tape of the construction illustrated in Fig. 2. Various forms of fibrous material may be used in fabricating the tape. I am presently employing a tape of cellulosic material such as cotton.

After the fluxing material and tape have been applied to the electrode the flux is dried thereon through natural evaporation or by some baking process. I prefer to dry the flux on the electrode from the inside out. This may be accomplished by heating the core before applying the flux thereto, or by generating heat in the core after the flux has been applied thereto by generating heating currents in the core by subjecting it to the action of a high frequency electric current. This may be accomplished by passing the finished electrode through a coil which is energized with high frequency current.

The electrode illustrated in the drawing is a short length such as would usually be employed in hand welding operations. The upper end of the electrode has been bared of flux in order to adapt the same for a suitable electrode holder by means of which currrent is conducted into the electrode. Electrodes may be made in accordance with my invention in long lengths for use in automatic or semi-automatic welding machines. In automatic arc welding machines the electrode is fed toward and away from the work to strike and thereafter maintain a welding arc by means of a mechanism which functions in response to a characteristic of the welding arc such as its voltage or current. In such automatic machines current may be fed to the electrode through incisions made in the flux coating or through openings provided by removing a portion of the coating from the electrode.

Electrodes manufactured in accordance with my invention may be made quickly and cheaply. The amount of flux material applied to the electrode can be accurately controlled through the proper selection of the tape and die employed in the manufacturing operation. Furthermore, my method of manufacture may be employed for applying light coatings to electrodes as well as applying heavy coatings thereto. When employed for applying heavy coatings to the electrode most of the flux can be applied to the electrode between the tape and the core thereof, due to the fact that the tape naturally follows the surface of the opening in the die. In making heavy coated electrodes this is an advantage for the layer of flux between the tape and the core of the electrode protects it from the action of the arc and facilitates the formation of a crater at the end of the electrode which has a confining action of the arc that greatly improves its operating characteristics as well as the quality of the weld metal deposited thereby.

While I have described a particular embodiment of my invention and a specific method of procedure for carrying it into effect, it will be obvious to those skilled in the art that various modifications may be made without departing from the spirit of my invention, and I desire to cover all such modifications as fall within the scope of my invention which is set forth in the appended claims.

What I claim as new and desire to secure by Letters Patent of the United States, is:

1. A welding electrode comprising a metallic core, a sheath of open-woven fibrous material folded longitudinally about said core with its edges abutting one another and a non-inflammable fluxing material between said sheath and said core and in the interstices of said sheath.

2. A welding electrode comprising a metallic core, a sheath of fibrous tape folded longitudinally about said core with its edges abutting one another and parallel to the axis of said core, and a fluxing material between said sheath and said core.

3. A welding electrode comprising a metallic core, a coating of non-inflammable flux on said core and a tape of cellulosic material impregnated with a non-inflammable material folded longitudinally about said coating with its edges abutting one another.

4. A welding electrode comprising a metallic core, a coating of non-inflammable flux on said core and a tape of open-woven cellulosic material impregnated with said flux folded longitudinally about said coating with its edges abutting one another and parallel to the axis of said core.

5. A welding electrode comprising a metallic core, a flux surrounding said core and a sheath of flux impregnated tape folded longitudinally about said flux and core with its edges abutting one another and parallel to the axis of said core, said tape being formed of a plurality of substantially parallel warp threads of greater size than the cross threads by means of which they are held together in spaced relationship to form an open-woven fabric.

6. A welding electrode comprising a metallic core, and a sheath of flux impregnated tape folded longitudinally about said core with its edges abutting one another and parallel to the axis of said core, said tape being formed of a plurality of threads interconnected to form a fabric which will not stretch substantially in a lengthwise or a crosswise direction, and the threads of which will not be displaced relatively to one another when subjected to a rubbing action such as occurs when applying said tape as a sheath over said core.

7. A welding electrode comprising a metallic core, a flux surrounding said core and a sheath of open-woven cellulosic fabric folded longitudinally about said core with its edges abutting one another and parallel to the axis of said core, said tape being impregnated with a non-inflammable material and being formed of substantially parallel threads of greater size than the cross-threads by means of which they are held together in spaced relationship to form said open-woven cellulosic fabric.

8. The method of making a welding electrode which comprises passing a metallic core and a tape of fibrous material through a bath of flux in paste form, folding said tape longitudinally about said core with its edges abutting one another and parallel to the axis of said core while maintaining said tape and said core in said flux paste, removing the core thus coated from said bath of flux paste and drying the flux on said core from the inside out.

9. The method of making a welding electrode which comprises passing a metallic core and a tape of fibrous material through a bath of flux in paste form, enclosing a layer of flux between said core and said tape by folding said tape longitudinally about said core with its edges abutting one another and parallel to the axis of said core while maintaining said tape and said core in said flux paste, removing the core thus coated from said bath of flux paste and drying the flux on said core from the inside out.

JOSEPH H. HUMBERSTONE.